United States Patent [19]
Jacko et al.

[11] 3,972,394
[45] Aug. 3, 1976

[54] FRICTION MATERIAL

[75] Inventors: Michael George Jacko, Southfield, Mich.; Bruce William Klein, South Bend, Ind.

[73] Assignee: The Bendix Corporation, South Bend, Ind.

[22] Filed: Sept. 8, 1975

[21] Appl. No.: 611,291

[52] U.S. Cl............................ 188/73.1; 188/251 A; 260/38
[51] Int. Cl.² ......................................... F16D 69/02
[58] Field of Search ....... 188/251 M, 251 R, 251 A, 188/73.1, 73.2, 71.1; 192/107 M, 70.14; 29/182.2; 260/38; 51/298; 117/161 R

[56] References Cited
UNITED STATES PATENTS

| | | | |
|---|---|---|---|
| 3,007,549 | 11/1961 | Klein | 188/251 R X |
| 3,344,094 | 9/1967 | deGaugue | 188/251 A |
| 3,856,120 | 12/1974 | Kwolek et al. | 188/251 A |

*Primary Examiner*—Trygve M. Blix
*Assistant Examiner*—Douglas C. Butler
*Attorney, Agent, or Firm*—Leo H. McCormick, Jr.; William N. Antonis

[57] ABSTRACT

An organic friction pad having iron powder particles added thereto to provide thermal stability when used with a copper rotor to maintain a substantially uniform coefficient of friction up to 550° F.

4 Claims, No Drawings

FRICTION MATERIAL

BACKGROUND OF THE INVENTION

Friction materials used as brake linings, disc brake pads, clutch facings and brake blocks are usually made from asbestos, organic friction modifiers and abrasive particles which are held together by a resin matrix. Such friction materials can have poor friction stability under varying temperature conditions. Since disc brake pads receive more thermal energy per surface area, it is necessary to modify the friction formula to provide an inherent thermal stability in order to prevent rapid wear and reduction of friction coefficient.

In an attempt to reduce the thermal energy in the disc pads, the rotors used in conjunction with the disc pads were redesigned to be made of a copper base material. Copper rotors have the ability to dissipate the thermal energy and thereby to reduce the wear rate. However, the abrasive particles currently used in the disc pad tend to score the copper base rotor.

In another attempt to provide frictional stability, a known prior art disclosure teaches that metal sulfide when added to a brake lining composition in place of the resin binder will reduce wear. However, the curing process required to convert the metal sulfide into a matrix binder requires pressures from 2 to 20 tons/in.$^2$ and temperatures from 572° to 1112° F. Therefore, such materials have not gained wide spread acceptance by the brake lining producers.

SUMMARY OF THE INVENTION

We have devised a composition for material for a brake lining wherein the addition of iron powder particles when added to an organic base composition with a resin binder will provide high thermal energy absorption. Thus, a brake pad using this material can be matched with a copper base and will have a substantially uniform coefficient of friction throughout the normal operating temperature range experienced by the brakes in heavy duty vehicles such as race cars, trucks, etc. A carbonaceous material and an organic friction modifier are essential to the composition to provide wear resistance while the iron powder particles will modify an abrasive friction producing particle to prevent the copper base rotor from being scored by the friction pad. Together all of the ingredients cooperate to provide wear resistance and a stable coefficient of friction.

It is therefore the object of this invention to provide an organic base friction material with a thermal dissipator consisting of iron powder particles to provide a disc brake pad with high energy absorption capabilities.

It is another object of this invention to provide a friction composition for use in a disc pad with high thermal energy absorption capabilities sufficient to produce a substantially uniform coefficient of friction when mated with a copper based rotor.

It is a further object of this invention to provide an organic friction composition with a carbonaceous material and barytes mineral materials to provide wear resistance and iron powder particles and an abrasive to provide high temperature friction stability when used as a friction pad engageable with a copper base rotor.

These and other objects will become apparent from reading this specification.

DETAILED DESCRIPTION OF THE PREFERRED COMPOSITION

The frictional composition in this invention has a binder or matrix which consists of a phenol formaldehyde resin as the thermosetting resin matrix, asbestos fiber for structural strength, and distributed throughout are filler particles such as rubber scrap, latex, molasses, asphaltic base particles, etc.; carbon or graphite, inorganic friction particles such as barytes, whiting, talc, rottenstone, etc.; abrasive particles such as silica, magnesium oxide, zircon, mullite, alumina, etc.; and iron powder particles. It has been found that such a composition when combined together will produce a friction composition for use as a disc brake pad having a coefficient of friction of approximately 0.45 to 0.55. This coefficient of friction was achieved when the disc pad was evaluated with a copper base rotor as compared to a typical composition whose coefficient of friction is approximately 0.30 to 0.40.

In order to compare the proposed friction composition we evaluated the same using different amounts of iron powder particles with a typical friction material; the ingredient of such compositions are as follows:

| ingredient | Typical Formula Weight % | Range | Modified For Use With Copper Rotors | | |
|---|---|---|---|---|---|
| | | | A | B | |
| Phenolic Resin | 12 | 9–15 | 13 | 13 | 11–15 |
| Asbestos Fiber | 40 | 30–50 | 30 | 36 | 30–40 |
| Organic Friction Modifiers (Rubber Scrap) | 15 | 8–19 | 12 | 12 | 10–15 |
| Inorganic Friction Modifiers (barytes preferred) | 18 | 12–26 | 18 | 18 | 15–30 |
| Abrasive Particles (Alumina preferred) | 8 | 5–11 | 4 | 4 | 3–7 |
| Carbonaceous Materials (Carbon preferred) | 7 | 4–20 | 8 | 8 | 3–12 |
| Iron Powder Particles | 0 | 0 | 15 | 9 | 7–15 |
| | 100 | | 100 | 100 | |

The ingredients in each formula were mixed together and cold-press formed into a preform briquette. The briquette was then hot pressed to desired final density (typically 2–3,000 psi and 300°–325° F.). The "press-cured" pad then receives a final oven cure to complete the thermoset and provide dimensional stability to the disc pad in actual service.

The brake pads were compared with a copper base rotor with the following results:

| Material | Coefficient of Friction | | | | | Wear (in. × 10⁻³) for Stop | | | | |
|---|---|---|---|---|---|---|---|---|---|---|
| | 250°F | 350°F | 450°F | 550°F | 650°F | 250°F | 350°F | 450°F | 550°F | 650°F |
| Typical Formula | .42 | .38 | .43 | .37 | .32 | 4 | 2 | 3 | 6 | 18 |
| Modified with iron powder particles | | | | | | | | | | |
| Formula A | .50 | .52 | .56 | .56 | .44 | 4 | 4 | 4 | 5 | 14 |
| Formula B | .48 | .51 | .52 | .49 | .46 | 3 | 3 | 4 | 6 | 14 |

From the above tests it can be seen that the addition of the iron powder particles to the frictional composition produces a material which possesses high thermal energy absorption as indicated by the substantially uniform coefficient of friction with a reduced wear rate.

We claim:

1. An organic friction lining pad for use with a copper rotor in a braking system having a composition consisting of:
   10–15 percent by weight of phenolic resin;
   25–45 percent by weight of asbestos fiber;
   10–15 percent by weight of an organic friction modifier selected from a group consisting of rubber scrap, latex, molasses and asphaltic base materials;
   3–12 percent by weight of a carbonaceous material selected from a group consisting of graphite and carbon;
   15–30 percent by weight of an inorganic friction modifier selected from a group consisting of barytes, whiting, talc and rottenstone;
   3–7 percent by weight of an abrasive particle selected from a group consisting of silica, magnesium oxide, zircon, mullite, and alumina; and
   7–15 percent by weight of iron powder particles, said phenolic resin being cured to form a binder for retaining said asbestos fiber, organic friction modifiers, inorganic friction modifiers, carbonaceous materials, abrasive particles, and iron powder particles in a fixed relationship to provide said pad with inherent thermal energy absorption capabilities aligned with said copper rotor and maintain a substantially uniform coefficient of friction up to 550°F.

2. The organic friction lining pad, as recited in claim 1, wherein said inorganic friction modifier is barytes, 3. The organic friction lining pad, as recited in claim 2, wherein said abrasive particle is alumina.

4. The organic friction lining pad, as recited in claim 3, wherein said iron powder particle size of less than 20 mesh.

* * * * *